J. W. KOHLHEPP.
CARCASS BEATING WHEEL.
APPLICATION FILED JULY 7, 1919.
1,357,640.
Patented Nov. 2, 1920.
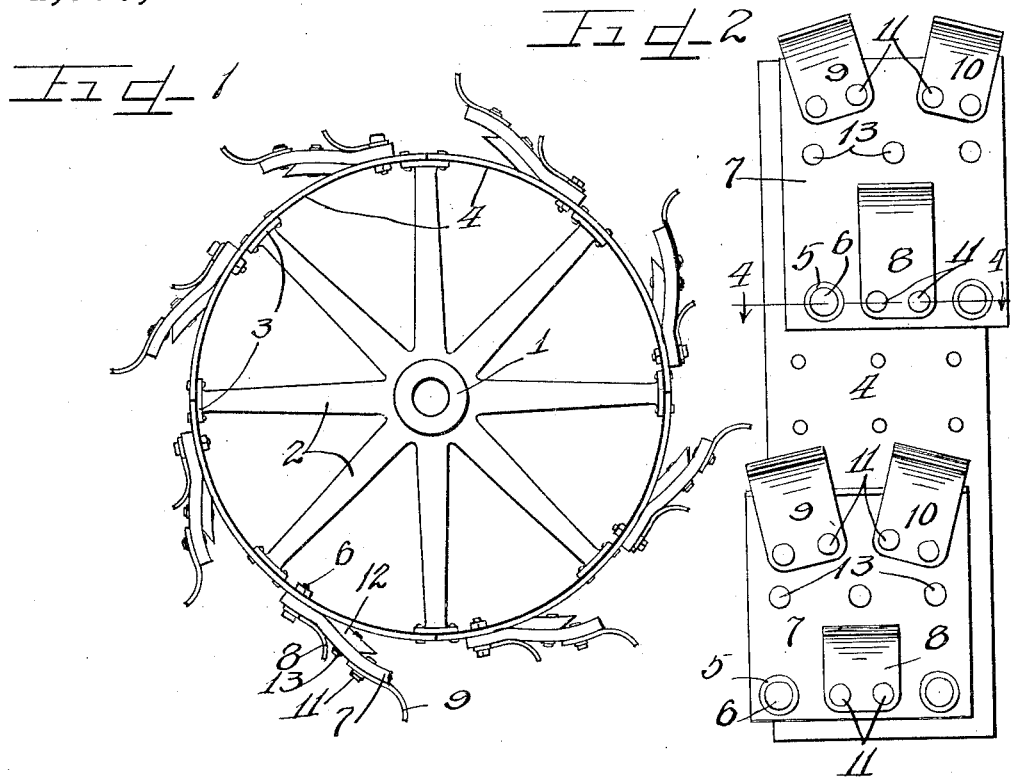
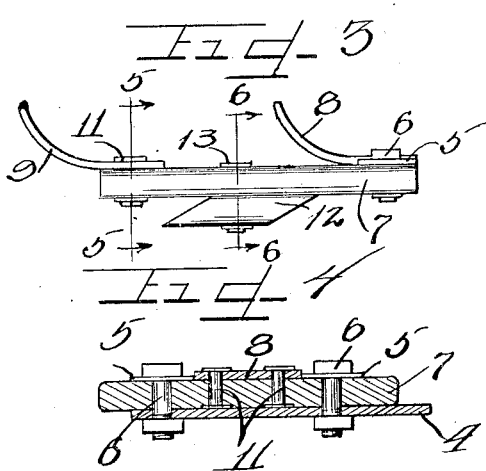
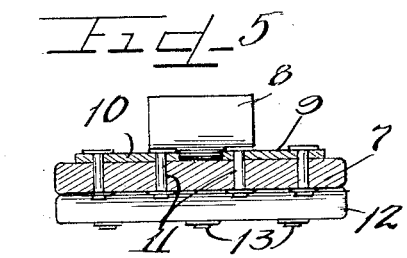
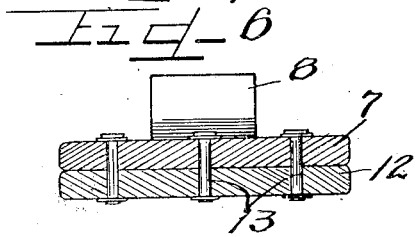
Witnesses
J. W. Angell
Charles W. Hills Jr.
Inventor
John H. Kohlhepp
by Charles W. Niles
Atty.

UNITED STATES PATENT OFFICE.

JOHN W. KOHLHEPP, OF CHICAGO, ILLINOIS, ASSIGNOR TO THE ALLBRIGHT-NELL COMPANY, A CORPORATION OF ILLINOIS.

CARCASS-BEATING WHEEL.

1,357,640.   Specification of Letters Patent.   Patented Nov. 2, 1920.

Application filed July 7, 1919. Serial No. 309,101.

*To all whom it may concern:*

Be it known that I, JOHN W. KOHLHEPP, a citizen of the United States, and a resident of the city of Chicago, in the county of Cook and State of Illinois, have invented certain new and useful Improvements in Carcass-Beating Wheels; and I do hereby declare that the following is a full, clear, and exact description of the same, reference being had to the accompanying drawings, and to the numerals of reference marked thereon, which form a part of this specification.

This invention relates to an improved type of carcass beating wheel wherein massaging and scraping mechanisms are mounted on the rim of a rigid wheel in alternate offset relation with one of their sides projecting beyond one of the edges of said rim.

It is an object of this invention to provide a carcass cleaning wheel wherein the cleaning mechanisms project beyond the sides of the wheel rim.

Another object of the invention is the construction of a carcass cleaning wheel having cushioned flexible cleaning arms mounted in staggered relation on the rim of a rigid wheel, with each arm so disposed that one margin thereof projects beyond one of the edges of said wheel rim.

It is also an object of this invention to construct a carcass cleaning wheel wherein cushioned staggered beater arms are provided with converging scraper blades at the free ends thereof.

A further object of the invention is the construction of a carcass cleaning wheel wherein a rigid wheel has flexible blade carrying arms secured on the rim thereof in projecting staggered relation, with each of said arms having a cushion member secured to the under surface thereof to contact the wheel rim.

It is an important object of this invention to provide a carcass cleaning wheel wherein a rigid wheel rim is equipped with a plurality of staggered resilient arms each of which is provided with a plurality of scraper blades and with a resilient cushion.

Other and further important objects of this invention will be apparent from the disclosures in the drawings and specification.

My invention (in a preferred form) is illustrated in the drawings and hereinafter more fully described.

On the drawings:—

Figure 1 is a side elevation of a carcass cleaning wheel embodying the principles of this invention.

Fig. 2 is an enlarged detail plan view of a portion of the wheel rim.

Fig. 3 is a side elevation of one of the carcass cleaning mechanisms removed from the wheel.

Fig. 4 is a section taken on line 4—4, of Fig. 2, showing parts in elevation.

Fig. 5 is a section taken on line 5—5 of Fig. 3, with parts in elevation.

Fig. 6 is a section taken on line 6—6, of Fig. 3, showing parts in elevation.

As shown on the drawings:—

The cleaning, scraping or massaging wheel comprises a hub 1, having integrally formed radially thereon a plurality of rigid spokes 2, each of which has an apertured head or plate 3, integrally formed on the outer end thereof. Riveted or otherwise rigidly secured to the apertured spoke heads 3, are a plurality of rigid metal rim strips or sections 4, which form a rigid wheel rim.

Each rim section 4, has removably secured thereto in staggered or offset relation a plurality of circumferentially disposed carcass scraping massaging or cleaning mechanisms, which are held secured in place by means of washers 5, and bolts 6. The scraping mechanisms are of substantially the same width as that of the rim sections, and as clearly shown in Fig. 2, the scraping mechanisms on each rim section are offset or staggered so that one side margin of each thereof projects beyond one edge of the rim section. Each scraping mechanism comprises a flexible scraping arm 7, made of multiple ply canvas or fabric. The arm is of a width substantially the same as the width of the rim section, and one end of said arm is removably bolted in place to the outer surface of the rim section by means of the washers 5 and the bolts 6. Riveted, or otherwise secured to each flexible arm 7, are three scraping or massaging blades 8, 9 and 10 respectively. The blade 8, is mounted centrally upon the attaching end of the arm 7, with the sides of the blade parallel to the sides of the arm. The two blades 9 and 10, are mounted on the free end of the arm 7, at an angle to the sides of the arm and converging toward one another. As disclosed in Fig. 3, the upturned ends of the scraping blades 9 and 10, project outwardly beyond the free end of the arm. Rivets 11, are used for securing the scraping blades in position on the flexible arms.

Rigidly secured transversely across the bottom or inner surface of each of the flexible arms 7, is a flexible cushion 12, made of canvas belting or heavy fabric. The cushions 12, are secured to the arms 7, by rivets or bolts 13. As shown in Fig. 3, each cushion 12, has parallel ends which are inclined with respect to the end surfaces of the arm to which the cushion is secured thereby permitting one of said inclined ends to rest against the outer surface of the wheel rim when the scraping mechanisms are secured in position. The cushions 12, serve to hold the free ends of the arms 7, projected outwardly from the wheel rim.

Attention is directed to Fig. 3, which clearly shows that the scraping mechanisms are adapted to be completely assembled before being mounted upon the rigid wheel rim.

I am aware that numerous details of construction may be varied through a wide range without departing from the principles of this invention and I therefore do not purpose limiting the patent granted further than necessitated by the prior art.

I claim as my invention:—

1. A carcass cleaning device comprising a rigid wheel, and a plurality of scraping mechanisms mounted thereon in staggered relation and projecting alternately beyond the sides of said wheel.

2. A carcass cleaning device comprising a rigid flat rimmed wheel, a plurality of arms secured thereon in staggered relation with alternate arms projecting beyond opposite sides of said wheel, and a plurality of scraper blades secured to each of said arms.

3. A carcass cleaning device comprising a rigid flat rimmed wheel, a plurality of arms secured thereon in staggered relation with alternate arms projecting beyond opposite sides of the wheel rim, a plurality of scraper blades secured to the outer surface of each of said arms, and a cushion secured to the inner surface of each of the arms to hold the arms extended.

4. A carcass cleaning device comprising a hub, spokes integrally formed thereon, sections secured to said spokes to form a rigid rim, and a plurality of scraping mechanisms secured on the rim in staggered relation with alternate mechanisms projecting beyond opposite sides of said rim.

5. A carcass scraping mechanism comprising a flexible arm, a flexible cushion secured to one surface thereof, a scraper blade secured centrally near one end of the opposite surface of the arm, and a pair of converging scraper blades secured on said opposite surface and projecting beyond one end of said arm.

6. A carcass cleaning device comprising a rigid wheel, and a plurality of flexible cushioned mechanisms secured thereon in staggered relation and alternately projecting beyond opposite sides of said wheel.

In testimony whereof I have hereunto subscribed my name in the presence of two subscribing witnesses.

JOHN W. KOHLHEPP.

Witnesses:
 EARL M. HARDINE,
 CHARLES W. HILLS, Jr.